Patented Jan. 2, 1951

2,536,987

UNITED STATES PATENT OFFICE 2,536,987

THIOETHERS AND THIOKETONES OF THIAZOLONE CYANINE DYES AS DYESTUFF INTERMEDIATES

Thomas R. Thompson, Binghamton, N. Y., assignor to General Aniline & Film Corporation, New York, N. Y., a corporation of Delaware No Drawing. Application December 21, 1948, Serial No. 66,572

4 Claims. (Cl. 260—240.1)

This invention relates to cyanine dyestuff intermediates and particularly to thioethers of alkylidene thiazolone cyanines and inner salts of thioalkylidene thiazolone cyanine dyes as intermediates for the preparation of chain-substituted tri- and tetranuclear cyanine dyes for sensitizing silver-halide emulsions.

It is known that in the preperation of chain substituted trinuclear dyes, it first is necessary to condense a quaternary salt of a heterocyclic nitrogen compound having a reactive methyl group, in the presence of an anhydride of a monobasic acid and an acid binding agent, with a 5-membered, 3-alkyl, 3-aryl, or 3-aralkyl substituted derivative of rhodanine, such as, for example, 3-methylrhodanine. The resulting thioketone is then reacted with an alkyl salt, for example, methyl-p-toluene-sulfonate, to give a methylmercapto derivative. This derivative is then condensed with a cyclammonium quaternary dye salt having a reactive methyl group in the 2-position of the nitrogen atom thereof to give a chain-substituted trinuclear dye. The procedure involved entails 3 separate reactions and is time consuming.

I have found that thiazolone cyanine dyes can be readily converted to thioethers, as hereinafter described, which readily react with heterocyclic quaternary salts containing a reactive methyl group, in one condensation reaction, to yield chain-substituted trinuclear dyes. When such chain-substituted thioethers are treated with heterocyclic keto-methylene compounds, such as rhodanines, novel chain-substituted trinuclear dyes result. When treated with thiazolone cyanine dyes, both symmetrical and unsymmetrical chain-substituted tetranuclear dyes are obtained. Although symmetrical chain-substituted tetranuclear dyes are known, there is no method, other than by the use of the intermediates of the present invention, which would lead to unsymmetrical tetranuclear dyes.

The thiazolone cyanine dye intermediates prepared according to the present invention are characterized by the following general formulae:

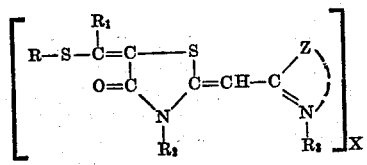

and

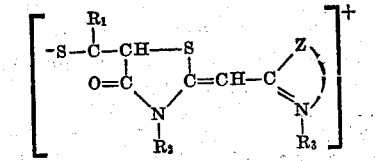

wherein R represents an alkyl or aralkyl group,
e. g., methyl, ethyl, propyl, isopropyl, benzyl, β-phenethyl, and the like, $R_1$ represents an alkyl group, e. g., methyl, ethyl, propyl, isopropyl, butyl, isobutyl, etc., $R_2$ represents an alkyl, alkenyl, aryl, or aralkyl group, e. g., methyl, ethyl, propyl, allyl, phenyl, naphthyl, tolyl, benzyl, phenethyl, and the like, $R_3$ represents an aliphatic radical, e. g., methyl, ethyl, propyl, butyl, hydroxethyl, ethoxyethyl; an aryl or aralkyl radical or substituted groups of this type, e. g., phenyl, naphthyl, tolyl, benzyl, menaphthyl, and the like, X represents an acid radical, e. g., chloride, bromide, iodide, or alkyl sulfate, alkyl p-toluenesulfonate or perchlorate, and Z represents the atoms necessary to complete a nitrogenous heterocyclic ring system of the type used in cyanine dyes such as pyridine, pyrroline, lepidine, quinoline, indolenine, oxazole, thiazolone, thiazole, thiodiazole, selenazole, selenazoline, oxazoline, benzothiazole, benzoselenazole, benzoxazole, naphthothiazole, peri-naphthothiazole, naphthoselenazole, and the like.

The dyestuff intermediates characterized by the foregoing formulae are obtained by treating a thiazolone cyanine dye with an aliphatic acid anhydride in the presence of a mixture of pyridine and triethylamine followed by treatment with phosphorus pentasulfide to yield the thio derivative which is subsequently alkylated with an alkylating agent in the usual way to yield the thioether derivative. The thiazolone cyanine dyes utilized in this reaction are characterized by the following general formula:

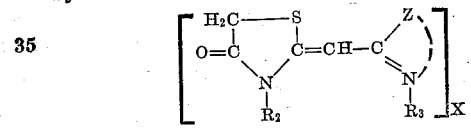

wherein $R_2$, $R_3$, X, and Z have the same values as above, and are prepared according to the method described in my copending application Serial No. 786,814, filed November 18, 1947. In general, the method consists of condensing a substituted thioamide with an α-halogen acetic acid. The compounds, in view of their ketomethylene configuration, undergo keto-enol tautomerism, i. e., the keto group enolizes to form a hydroxyl group.

As examples of aliphatic anhydrides, the following may be mentioned: acetic, propionic, N-butyric, isobutyric, n-valeric, and isovaleric anhydrides.

As alklating agents which may be employed in alkylating the thio derivative, the following may be mentioned: alkyl esters, such as methyl sulfate, or methyl, ethyl, propyl, or isopropyl derivatives of p-toluenesulfonates, and aralkyl halides, such as benzyl chloride, β-phenethyl bromide and the like.

The following examples describe the preparation of some of the thiazolone cyanine dyes which are utilized in the preparation of the dyestuff intermediates:

Example I

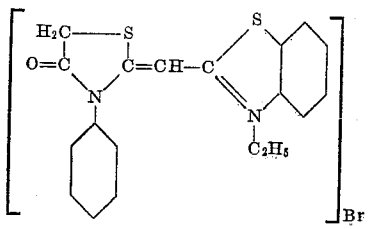

A mixture of 25 grams of α-(3-ethylbenzothiazolylidine)-thioacetanilide and 25 grams of bromoacetic acid was heated in 50 cc. of n-butanol for 10 minutes at 110° C., the solution becoming deep yellow in color. The mixture was cooled, stirred with ether, filtered, and washed with ether. The residue was dried at 80° C. to yield 34.9 grams of a solid melting at 231-236° C. A 10 gram fraction of this was recrystallized from methanol to yield 7.7 grams of the final dye, melting at 233-234° C.

Example II

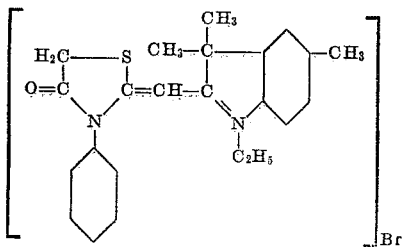

6.9 grams of α-(1-ethyl-3,3,5-trimethylindolinylidine)-thioacetanilide were heated with 6.9 grams of bromoacetic acid in 25 cc. of n-butanol at 105-110° C. for 10 minutes. The mixture was treated with ether and the ether layer decanted. The black liquid was stirred with isopropanol and filtered. The residue was recrystallized from methanol to yield 1.7 grams of the final dye having a melting point at 236-238° C.

Example III

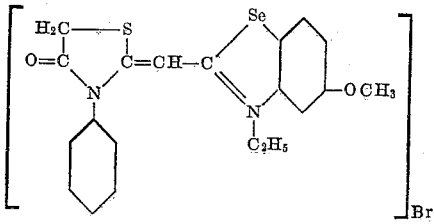

A mixture of 4.11 grams of α-(3-ethyl-5-methoxybenzoselenazolylidine) - thioacetanilide, 4.11 grams of bromoacetic acid, and 45 cc. of n-butanol was heated at 90° C. for 20 minutes and at 110° C. for 10 minutes. The thick slurry of greenish crystals was thinned with three volumes of ether and filtered to yield 5.0 grams of a product, melting at 283-284° C.

Example IV

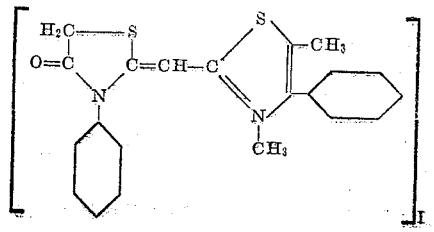

A mixture of α-(3,5-dimethyl-4-phenylthiazolylidine)-thioacetanilide, 1.0 gram of bromoacetic acid, and 2 cc. of acetic acid was heated at 115° C. for 1 hour. The product was precipitated with ether and subsequently washed with ether by decantation. The viscous product does not solidify and may be used directly in dye synthesis.

Example V

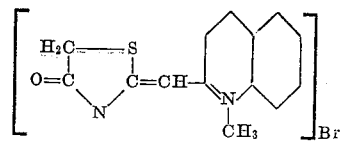

A mixture of 5.5 grams of α-(1-methyl-2-quinolylidine)-thioacetanilide and an equal weight of bromoacetic acid was dissolved in 50 cc. of n-butanol and heated at 100° C. for 10 minutes. On cooling, yellow crystals formed which were filtered and washed with ether. Recrystallization from methanol yielded yellow crystals melting at 212° C.

Example VI

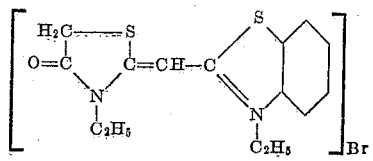

A mixture of 1.5 grams of α-(3-ethylbenzothiazolylidine)-4-ethylthioacetamide, 1.5 grams of bromoacetic acid and 5 cc. of acetic acid was heated at 120° C. for 5 minutes. After cooling, the product was precipitated with ether and dried to yield 2.07 grams.

The amines of the foregoing thiazolone cyanine dye salts may be replaced by iodide, thiocyanate, or perchlorate ions by treating an alcohol solution of the dye salt with an aqueous or alcoholic solution containing a sodium or potassium salt of the desired anion.

The following examples describe the preparation of the thiazolone cyanine dye intermediates from the foregoing thiazolone cyanine dyes. It is to be understood that they are given merely for the purpose of illustration and are not to be construed as limitative.

Example VII

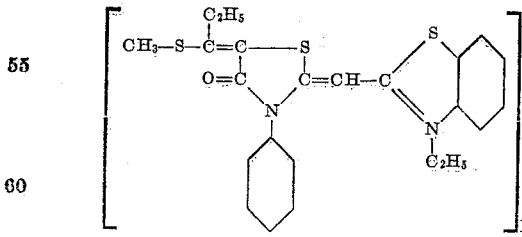

A mixture of 75 cc. of pyridine, 10 cc. of propionic anhydride, 10 cc. of triethylamine, and 13.0 grams of the thiazolone cyanine dye of Example I was heated with stirring at 120° C. for 20 minutes. During the course of 10 minutes, a total of 10 grams of phosphorus pentasulfide was added in portions at 120° C. After an additional 10 minutes heating and stirring at 120° C., the mixture was poured into cold water and stirred until the first formed oil solidified. The crude product was stirred with 300 cc. of a 10% aqueous solution of sodium hydroxide and purified by boiling out with isopropanol. There was obtained 10.2 grams of yellow powder which decomposes at about 200° C.

A mixture of 9.3 grams of the yellow powder and 10 grams of methyl p-toluenesulfonate was fused at 95° C. for one hour. After cooling, the product was washed with ether and dissolved in 10 cc. of warm acetone. The final product was precipitated as the iodide by adding 25 cc. of methanol containing 20% sodium iodide. The product was washed with water and purified by boiling out with isopropanol. A yield of 4.3 grams of a product melting at 225–228° C. was obtained.

*Example VIII*

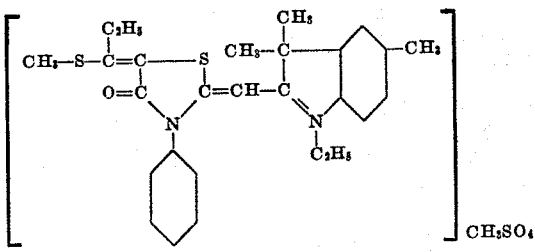

A mixture of 15 cc. of pyridine, 2 cc. of propionic anhydride, 2 cc. of triethylamine, and 2.0 grams of the thiazolone cyanine dye of Example II was heated at 120° C. for 3 minutes. There were then added 2.0 grams of phosphorus pentasulfide and the mixture heated at 115° C. for 15 minutes. A dark red oil was precipitated by the addition of 100 cc. of water and washed with water by decantation. The product was fused with 3 cc. of methyl sulfate at 95° C. for 10 minutes to yield 4.5 grams of a yellow-orange solution which may be employed in dye syntheses.

*Example IX*

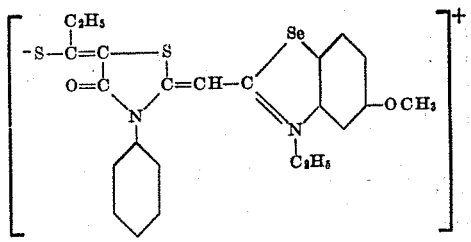

A mixture of 50 cc. of pyridine, 10 cc. of triethylamine, 10 cc. of propionic anhydride, and 5.0 grams of the thiazolone cyanine dye of Example III was stirred at 120° C. for 20 minutes. Five grams of phosphorus pentasulfide were then added and stirring at 120° C. continued for 30 minutes. After standing overnight the reaction mixture was diluted with 100 cc. of water to yield a thick oil. After triturating with isopropanol, the oil crystallized to give 2.8 grams of glistening needles.

*Example X*

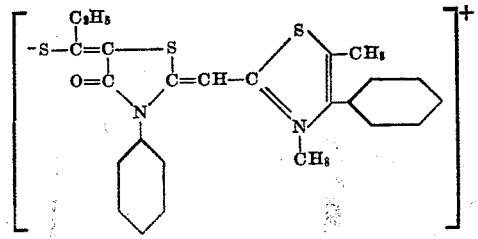

To a mixture of 75 cc. of pyridine, 15 cc. of propionic anhydride and 15 cc. of triethylamine was added the washed heavy oil of Example IV and the resulting solution heated at 120° C. for 30 minutes. Fifteen grams of phosphorus pentasulfide were added in portions and the reaction mixture stirred at 120° C. for 30 minutes. The product was isolated by pouring the reaction mixture into 300 cc. of water. The product was purified by washing with water and subsequently grinding with acetone. A yield of 10.9 grams of yellow glistening crystals melting at 255–260° C. was obtained.

*Example XI*

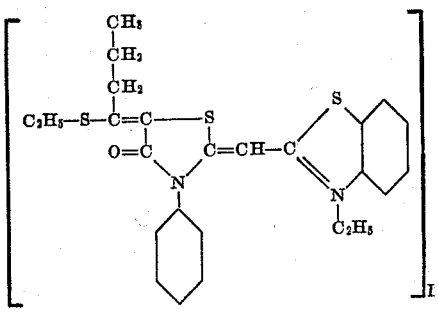

A mixture of 25 grams of the compound of Example I, 20 cc. of n-butyric anhydride, 100 cc. of pyridine and 20 cc. of triethylamine was heated and stirred at 120° C. for 20 minutes. There was then added 20 grams phosphorus pentasulfide and stirring at 120° C. continued for 20 minutes. The reaction mixture was poured into 700 cc. of cold water. The resulting brown precipitate was filtered off, washed with water, and boiled out with 100 cc. of isopropyl alcohol. A yield of 20.9 grams of the dried and purified product was obtained. The compound is presumed to be an inner salt characterized by the following formula:

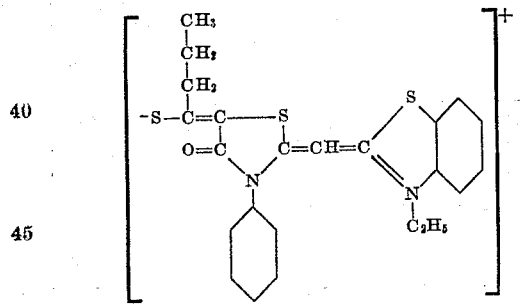

A mixture of 2.0 grams of the above material and 2.0 grams of ethyl p-toluenesulfonate was fused at 95° C. for 30 minutes. The reaction mixture was dissolved in 30 cc. of hot acetone, and 10 cc. of a 10% solution of sodium iodide in acetone was added. After cooling, the crystals were separated and purified by boiling out with isopropyl alcohol. A yield of 1.0 gram of a product melting between 210–213° C. was obtained.

*Example XII*

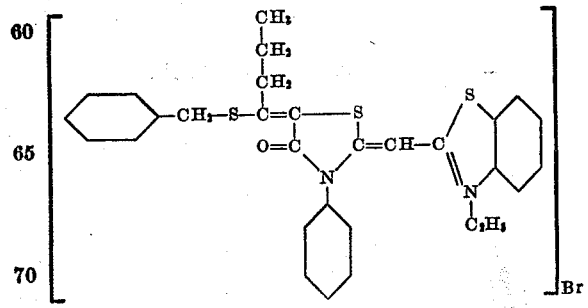

A mixture of 4 cc. of benzyl bromide and 2.0 grams of the inner salt prepared according to Example XI was fused at 110° C. for 30 minutes. The reaction product was washed with ether to yield 2.5 grams of a yellow viscous oil which could not be made to solidify. The oil is soluble in methanol, and in the presence of triethylamine reacts readily with various dye intermediates, e. g., 2-methylbenzothiazole ethiodide, to form trinuclear chain-substituted dyes.

*Example XIII*

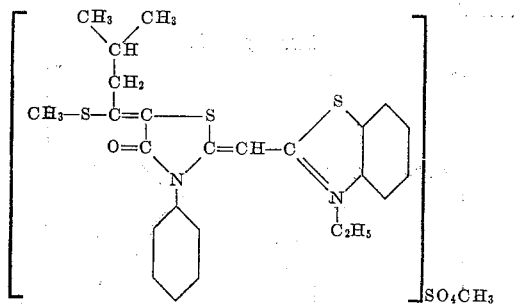

A mixture of 25 grams of the compound of Example I, 20 cc. of isovaleryl chloride, 100 cc. of pyridine, and 20 cc. of triethylamine was heated and stirred at 120° C. for 30 minutes. There was then added 20 grams of phosphorus pentasulfide and the stirring at 120° C. continued for an additional twenty minutes. The reaction mixture was poured into 500 cc. of water and the precipitated viscous semi-solid washed with water by decantation. After boiling-out with 100 cc. of isopropyl alcohol, the material solidified. A yield of 17.1 grams of a brown powder, melting at 203-209° C. was obtained. This material was fused with methyl sulfate to give the reactive dye intermediate illustrated by the above formula.

The thio derivative obtained according to Examples IX and X may also be converted into their corresponding alkyl and aralkyl thioethers by fusion of the thio derivative with an alkyl or aralkyl halide, or by heating the thio derivative with an alkyl or aralkyl salt such as the sulfate, p-toluenesulfonate or halide, i. e., chloride or bromide in a sealed tube in a water bath under increased pressure.

While I have disclosed the preferred embodiments of my invention and the preferred modes of carrying the same into effect, it will be readily apparent by those skilled in the art that many variations may be made therein without departing from the spirit thereof. Accordingly, the scope of my invention is to be limited solely by the appended claims.

I claim:

1. A thiazolone cyanine dyestuff intermediate characterized by a formula selected from the class consisting of the following formulae:

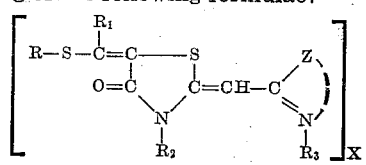

and

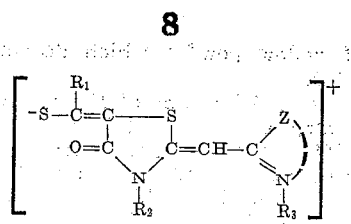

wherein R represents a member selected from the class consisting of alkyl and aralkyl groups, $R_1$ represents an alkyl group, $R_2$ represents a member selected from the class consisting of alkyl, allyl, aryl, and aralkyl groups, $R_3$ represents a member selected from the class consisting of lower alkyl, lower hydroxyalkyl, lower alkoxyalkyl, aryl of the benzene and naphthalene series, and aralkyl groups, X represents an acid radical, and Z represents the atoms necessary to complete a heterocyclic nitrogenous nucleus of the type used in cyanine dyes.

2. A thiazolone cyanine dyestuff intermediate of the formula:

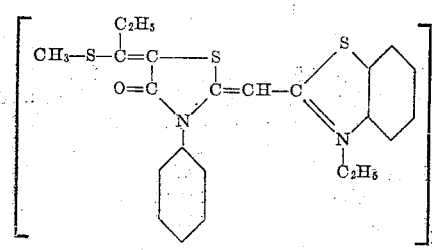

3. A thiazolone cyanine dyestuff intermediate of the formula:

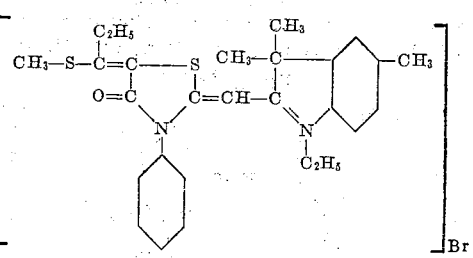

4. A thiazolone cyanine dyestuff intermediate of the formula:

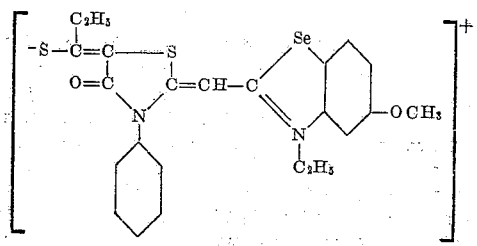

THOMAS R. THOMPSON.

No references cited.